June 7, 1932.  W. L. FRY  1,862,476
SEAT COVER
Filed April 4, 1929
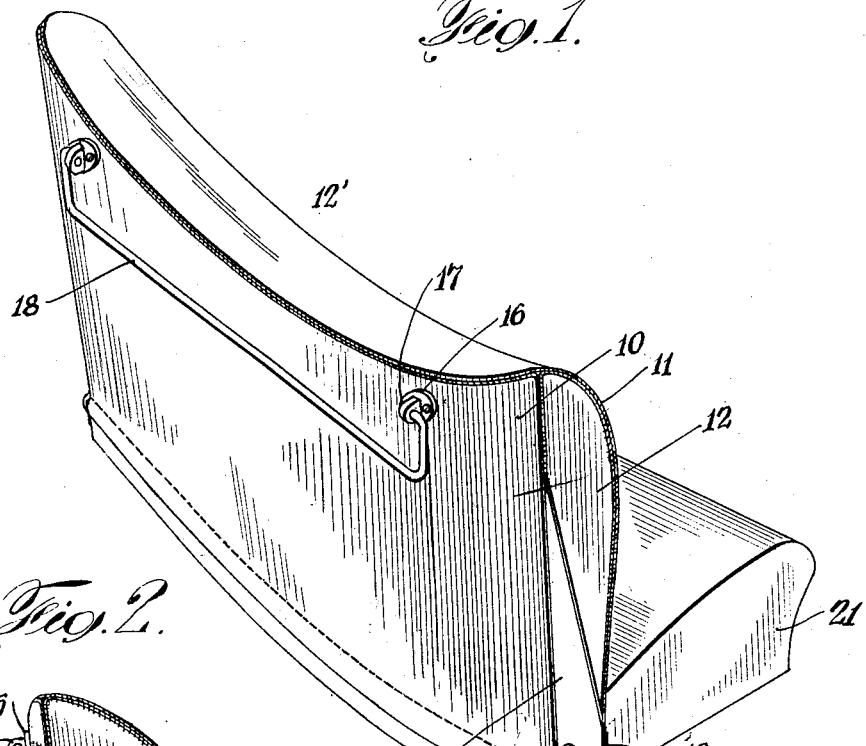
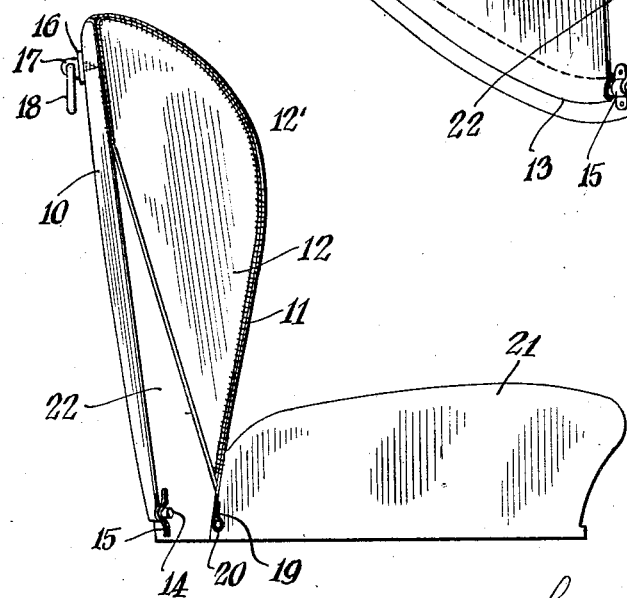
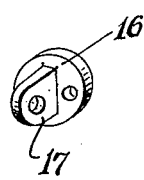
Inventor,
Walter L. Fry.
By his Attorneys.
Hoguet & Neary.

Patented June 7, 1932

1,862,476

UNITED STATES PATENT OFFICE

WALTER L. FRY, OF SCARSDALE, NEW YORK, ASSIGNOR, BY MESNE ASSIGNMENTS, TO WIL-FRY CORPORATION, OF NEW YORK, N. Y., A CORPORATION OF DELAWARE

SEAT COVER

Application filed April 4, 1929. Serial No. 352,375.

My invention relates to improvements in removable seat covers or so-called slip covers for the back rest of a seat, and particularly the back rest of a motor car seat in which the back as well as the front portions of the said back rest are exposed to view.

The object of my invention is to produce a simple form of cover in the shape of a hood which can be pulled on over the back rest so as to substantially cover and enclose the same, and moreover to provide means for easily and securely fastening the cover to the end that it may lie smoothly and handsomely in place.

A further object of my invention is to provide means for securing the back part of the aforesaid hood at its lower edge so that the strain thereon will be distributed across its entire width to the end that it may be held against possible accidental displacement.

Moreover, my invention includes the means of supporting a hanger bar or bail in the conventional way and having the supporting brackets of the bar or bail act as fastening members for the back portion of the aforesaid hood or seat cover.

The invention is also intended to have the lower front part of the hood provided with a stiffening element at its terminal edge which is disposed to lie between the seat cushion and the back rest and thus be held in place. The lower front edge is provided with a stiffening element which serves to keep the front part of the hood smooth and this part is preferably unattached so that it will have a certain freedom of movement but will not be easily torn or displaced.

In general, the invention is intended to produce a hood type of back rest cover which can be easily applied or removed and which is certain to wear well and look well.

Other benefits and objects of the invention will appear from the following description and accompanying drawing in which like reference characters refer to similar parts throughout the several views.

Figure 1 is a perspective view of a conventional seat showing my cover attached thereto;

Figure 2 is a side elevation of the seat and cover; and

Figure 3 is a detail of a hanger rod or bail bracket which can be used.

In carrying out my invention I make a hood open at the bottom and somewhat open at the sides in order that it may be easily applied and this is of course cut to fit evenly and nicely upon the back rest of a seat. The particular form of the hood will of course be varied to meet different conditions, that is, to fit the particular back rest to which it is applied.

The seat cover or hood comprises a back portion 10 cut to fit nicely upon and conceal the back part of the back rest 12', presently referred to, a front portion 11 shaped to fit smoothly upon the front of the back rest, and side parts 12 which cover the upper part of the sides and a part of the whole side portions of the seat. The hood can obviously be made in more or less pieces but I find it convenient and better adapted to make a nice fitting cover to have the front part 11 of a length to extend to the back upper edge of the back rest where it is attached to the upper part of the back part 10. The said part 10 is of a size to cover and conceal the back of the back rest 12' and at its lower edge instead of being fastened by tacking or otherwise along the said lower edge it is associated with a distributing bar 14 which conforms to the shape of the back rest at this part and which can be conveniently placed through a hem or casement 13 at the lower extremity of the back 10.

The protruding ends of the distributing bar 14 can be secured by suitable keepers 15 which are attached to the back rest. It is desirable to have a hanger bar or bail 18 in the usual place at the upper part of the back rest and on the back thereof and I utilize the means of supporting this bar as an additional fastening element to hold the upper part of the hood or cover against displacement. To this end suitable brackets 16 are adapted to fit upon the cover near the upper part and near opposite sides and the brackets can be secured by screws or otherwise and can be of any approved form. They are provided with a projecting post 17 as illustrated on which the bar 18 is hung as usual. Thus the usual and desirable hanger bar can be used and its supporting means, which, in the example illustrated, are the brackets 16, can be used as fastening elements to assist in holding the hood or cover in perfect position. The sides 12 of the hood or cover can more conveniently be separate pieces which are stitched or otherwise attached to the front and rear portions 10 and 11 of the hood or cover. At the upper parts the sides preferably completely encase the side parts of the back rest but they are preferably left open somewhat near the bottom as shown at 22 in order that the hood may be more easily applied.

The front part 11 of the hood or cover extends downward to a point near the bottom of the back rest and preferably between the seat cushion 21 and the lower part of said back rest. Here it terminates and is provided with a hem 19 in which a stiffening element 20 is placed and this serves to hold the front portion of the back rest cover smoothly in position and it is held by the pressure of the seat cushion 21 upon it.

Thus it will be seen that a simple type of hood is used which can be pulled on over the back rest with the utmost facility and with its front and rear edges held in such a way that there is no strain on any one point but the strain is distributed across the whole front and rear parts. It will also be noted that by removing one of the keepers 15 and the brackets 16 the hood can be easily removed.

The particular manner in which the hood is made is not important so long as it is in the form of a casing which can be applied or removed as stated and in which the lower front and rear portions are secured in substantially the manner set forth.

It will also be noticed that the distributing rod 14 is also a stiffening element and that there are elements of this character therefore at both the front and rear lower extremities of the hood or cover.

In a structure of the kind described it is desirable to have the front and rear edges of the cover fastened as specified so that the strain may be distributed on both parts of the hood but if the front edge is otherwise fastened this structure will still be desirable as the back rest will be covered and nicely secured by the distributing rod or stiffening element 14.

I claim:

A cover for the back rest of a cushioned seat of the type having an exposed back comprising a hood open at the bottom and having a portion extending over the front of the back rest, a portion extending over the entire seat back, and end portions secured to said hood along the upper edges of the back portion and along the entire side edges of said front portion, said end portions being cut obliquely to allow adjustability over the end of the back rest, distributing elements carried by the lower edges of said front and back covering portions, said front distributing element being secured between the seat cushion and back rest cushion, and said back distributing element being secured to a support at the end of the back rest.

In testimony whereof, I have signed my name to this specification this 13th day of March, 1929.

WALTER L. FRY.